United States Patent

[11] 3,622,897

[72] Inventor Masanobu Tsugita
Tokyo, Japan
[21] Appl. No. 886,495
[22] Filed Dec. 19, 1969
[45] Patented Nov. 23, 1971
[73] Assignee Nippon Electric Company Limited
Tokyo, Japan
[32] Priority Dec. 26, 1968
[33] Japan
[31] 43/96165

[54] BIAS CIRCUIT FOR A DIFFERENTIAL AMPLIFIER
1 Claim, 4 Drawing Figs.

[52] U.S. Cl. .......... 329/129, 329/192, 330/30 D, 330/40
[51] Int. Cl. .......... H03d 3/10
[50] Field of Search .......... 330/30, 30 D, 40, 69, 146; 329/129, 192

[56] References Cited

UNITED STATES PATENTS

| | | | |
|---|---|---|---|
| 3,444,477 | 5/1969 | Avins | 330/30 X |
| 3,482,176 | 12/1969 | Yourke et al. | 330/30 |

*Primary Examiner*—Roy Lake
*Assistant Examiner*—James B. Mullins
*Attorney*—Sandoe, Hopgood and Calimafde

ABSTRACT: A bias circuit for a differential amplifier comprises a DC balanced bridge having a DC potential applied across one diagonal of the bridge, the biasing potentials for each amplifier of the differential amplifier being taken from the two points located on the other bridge diagonal.

INVENTOR
MASANOBU TSUGITA

BY Sandoe, Hopgood and Calimafde
ATTORNEY

INVENTOR
MASANOBU TSUGITA

BY Sandoe, Hopgood and Calimafde
ATTORNEY

BIAS CIRCUIT FOR A DIFFERENTIAL AMPLIFIER

This invention relates to the bias circuit for a differential amplifier of the type including a pair of amplifiers and, in particular, to the bias circuit of a differential amplifier accompanying a ratio detector.

With respect to differential amplifiers employing transistors, a pair of transistors which have the same characters are preferably used, with both emitters being connected to a common point and the same bias potential applied to each transistor base by connecting a constant current source, or resistors which serve as a constant current source, to the common emitter connection point, so that the pair of transistors operate with balanced collector or emitter currents of both transistors in DC.

A differential amplifier, generally, may amplify an AC signal or the displacement component of a DC signal with the dynamic point given by an applied bias potential. In the case of the amplification of an AC signal the input terminal of the differential amplifier, at which said AC signal may be applied, should be open to DC. In the case of the amplification of the displacement component of the DC signal (or DC amplification), the input terminal should be closed to DC.

It is an object of this invention to provide a novel bias circuit for a differential amplifier.

Briefly, the invention is predicated upon a bias circuit for the differential amplifier which circuit assumes a given AC operation and includes a balanced DC bridge circuit wherein a DC voltage is applied across one diagonal of said bridge circuit, and each potential obtained at points on the opposite diagonal of said bridge circuit is applied to each amplifier in the differential amplifier for the biasing thereof.

The above-mentioned and other features and object of this invention and the manner of attaining them will become more apparent and the invention itself will best be understood by reference to the following description and embodiments of the invention taken in conjunction with the accompanying drawings, the description of which follows.

Figure 1:
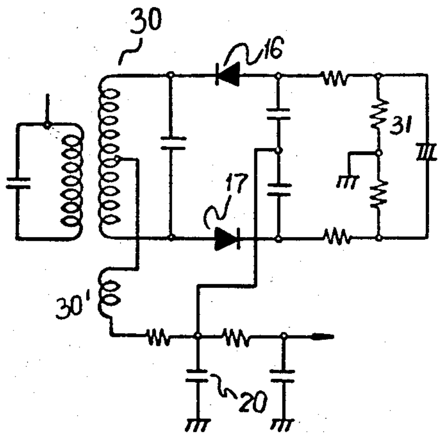
Figure 2:
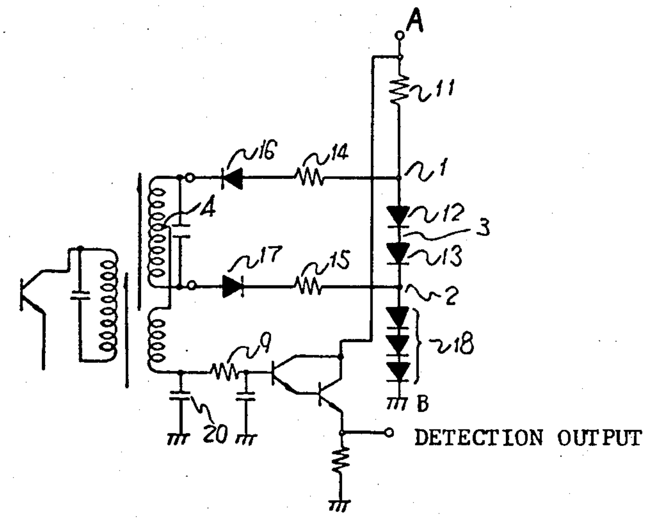
Figure 3:
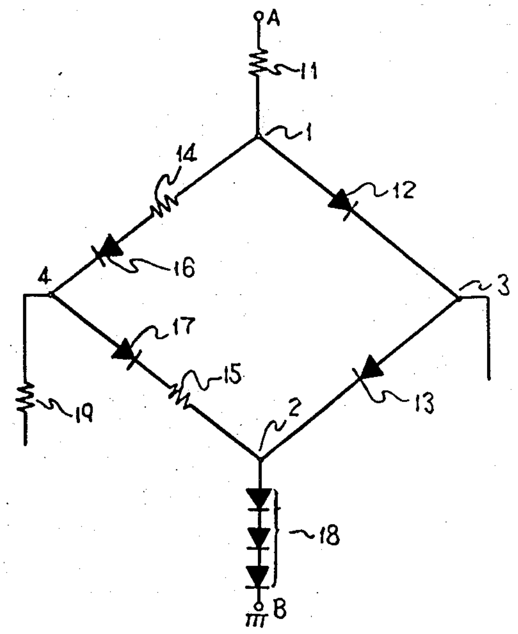
Figure 4:
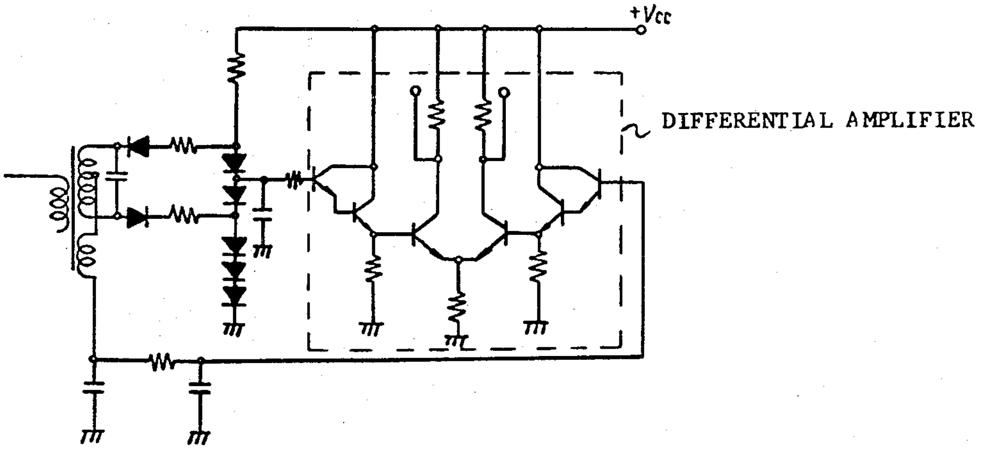

FIG. 1 schematically shows a conventional ratio detector circuit;

FIG. 2 schematically shows a ratio detector circuit employed for the embodiment of this invention;

FIG. 3 shows the DC equivalent circuit of a part of the ratio detector circuit shown in FIG. 2; and FIG. 4 schematically illustrates an embodiment of this invention.

A ratio detector, which is employed for the demodulation of an FM signal is well known for detecting the deviation of a frequency from the reference frequency. A ratio detector is also used for the demodulation of an FM signal and for detecting the frequency drift of a local oscillator (to control the oscillating frequency thereof) in a superheterodyne-type receiver, at the same time.

With respect to such a ratio detector which is shown in FIG. 1, the middle point of a load resistance 31 is directly grounded, one lead of a capacitor 20 is connected to the third coil 30' of a phase transformer 30, the other lead is grounded, and the voltage across capacitor 20 may be obtained as the output with respect to ground. While this ratio detector can be connected to a grounded-emitter type amplifier, it cannot be connected to a differential amplifier due to the circuit configuration.

In order to apply the output of the described ratio detector to a differential amplifier, a double detecting circuit has been proposed between two ratio detectors are employed and are connected to each other in parallel. However, in such a case, the bias voltage for the differential amplifier connected to the double detecting circuit must be applied from other circuits.

Where a silicon diode is used as detecting diode, means may be employed to constantly flow a weak DC current through the diode so that the long forward buildup time of the silicon diode may be compensated. Such a circuit is shown in FIG. 2. The embodiment of this invention, which is shown in FIG. 4, employs the circuit shown in FIG. 2 to apply the bias voltage for the differential amplifier, as will be described hereinafter.

In accordance with this invention, each bias voltage applied to each of the amplifiers composing the differential amplifier is not affected by a variation in voltage of the power source, temperature and so on.

To aid in understanding the invention, the circuit including diodes 12, 13, 16, 17 and 18, which composes a part in the ratio detector shown in FIG. 2 maybe illustrated as a bridge circuit in FIG. 3. In FIGS. 2 and 3, the same reference numerals are used to designate similar components.

With the voltage applied between points A and B in such a manner that the potential of point A is positive with respect to point B, a DC current flows through resistor 11 and to two current paths at point 1. One current path includes diodes 12 and 13, while the other includes resistor 14, diodes 16 and 17, and resistor 15. Both current paths are connected to each other at the common connection point 2. The DC current flowing through each of the two current paths then flows from point 2 to the group of diodes 18 and returns to the negative side of the power source (not shown). The closed loop connecting the points 1, 2, 3 and 4 may be recognized as a bridge circuit.

If diodes 12 and 13, diodes 16 and 17, and resistors 14 and 15 have the same impedance, respectively, the potential of the connection points 3 and 4 is half that between terminals 1 and 2. The voltage between points 3 and 4 is necessarily zero regardless of the characteristics of the diodes and resistors, voltage of the power source, ambient temperature and so on, so long as the described relationship exists. If each potential of each of points 3 and 4 is applied as a bias voltage to each amplifier, for example to the bases of the transistors of the differential amplifier, each amplifier composing the differential amplifier is biased at the same bias voltage and the differential amplifier is balanced in its operation.

Where the differential amplifier includes two transistor amplifiers, current may flow out from each of the points 3 and 4 to apply a bias current to the base of each amplifier and, as a result, a voltage is derived between points 3 and 4. But, the voltage is very small and may be ignored because the bias current is far less than the current flowing through each arm of the bridge circuit.

In order to minimize the voltage difference between points 3 and 4 when the differential circuit is connected to the bridge circuit, the impedance of each of the four arms of the bridge circuit may be equal, the arms embracing the point 1 therebetween and the arms embracing the point 2 therebetween may be made equal, respectively, or a differential amplifier having a high-point impedance may be employed.

A circuit using vacuum tubes or MOS-type transistors may be employed for this latter purpose.

In the embodiment of the invention shown in FIG. 4, a differential amplifier employing transistors is used, wherein darlington circuits are employed to make the impedance high.

The detected signal and DC bias voltage can be directly applied to the differential amplifier from the detector, and the bias voltage of the differential amplifier is not affected by the ambient temperature, the variation of the voltage of the powder source and so on.

The circuit of the embodiment shown in FIG. 4 is convenient to integrated-circuit usage. The potential at points 2 and 4 in the bridge circuit is determined by the value of the voltage of the powder source, of the resistor 11, of the group of diodes 18, and other elements. Thus, as will be appreciated by those skilled in the art, by choosing the parameters of such elements the desired bias voltage can be obtained at the points 3 and 4.

In the above description, this invention has been explained in connection with a particular embodiment employing a ratio detector for the bias circuit of the differential circuit. But, it will be easily understood to those skilled in the art that this invention should not be so restricted, but that all circuits which may compose a balanced bridge circuit in DC and which are capable of assuming a desired AC operation, may be employed for the bias circuit.

What is claimed is:

1. In a circuit comprising a ratio detector and a differential amplifier for amplifying a detection output from said ratio detector, said ratio detector including a phase transformer having a secondary winding including a midpoint and end connection points thereon, a first branch including a first diode, one end of said first diode being connected to one end of said secondary winding, a second branch including a second diode, and one of said second diode being connected to the other end of said secondary winding, said second diode being oppositely poled in relation to said first diode, third and fourth branches each including a diode therein, said third and fourth branch diodes being connected to each other in series at one end of said respective branches, said diodes being poled in a like direction the remaining end of said third branch being connected to the remaining end of said first branch, and the remaining end of said fourth branch being connected to the remaining end of said second branch;

a DC current source connected between a connection point between said first and third branches and a connection point between said second and fourth branches;

a differential amplifier having two inputs;

first connection means for applying the output from said midpoint of said secondary winding of said phase transformer to one input of said differential amplifier; and second connection means for applying the potential at a connection point between said third and fourth branches to the other input of said differential amplifier; whereby DC bias voltage and a detection output from said ratio detector are applied to said differential amplifier.

* * * * *

UNITED STATES PATENT OFFICE

CERTIFICATE OF CORRECTION

Patent No. 3,622,897 Dated November 23, 1971

Inventor(s) Masanobu Tsugita

It is certified that error appears in the above-identified patent and that said Letters Patent are hereby corrected as shown below:

Claim 1, column 3, line 10, "and one" should read -- one end -- .

Signed and sealed this 10th day of October 1972.

(SEAL)
Attest:

EDWARD M.FLETCHER,JR.
Attesting Officer

ROBERT GOTTSCHALK
Commissioner of Patents